United States Patent
Dawley (10) Patent No.: US 10,014,680 B2
(45) Date of Patent: Jul. 3, 2018

(54) OVERVOLTAGE NOTCHING OF ELECTRICITY DELIVERED TO AN ELECTRICAL LOAD

(71) Applicant: Electronic Systems Protection, Inc., Knightdale, NC (US)

(72) Inventor: Robert A. Dawley, Clayton, NC (US)

(73) Assignee: Electronic Systems Protection, Inc., Knightdale, NC (US)

( * ) Notice: Subject to any disclaimer, the term of this patent is extended or adjusted under 35 U.S.C. 154(b) by 811 days.

(21) Appl. No.: 14/564,786

(22) Filed: Dec. 9, 2014

(65) Prior Publication Data

US 2016/0164274 A1 Jun. 9, 2016

(51) Int. Cl.
*H02H 3/22* (2006.01)
*H02H 3/20* (2006.01)
*H02H 9/00* (2006.01)

(52) U.S. Cl.
CPC .............. *H02H 3/22* (2013.01); *H02H 3/20* (2013.01); *H02H 3/202* (2013.01); *H02H 9/005* (2013.01)

(58) Field of Classification Search
CPC ............. H02H 3/20; H02H 3/22; H02H 9/005
See application file for complete search history.

(56) References Cited

U.S. PATENT DOCUMENTS

| | | | |
|---|---|---|---|
| 4,369,490 A * | 1/1983 | Blum | H02M 1/14 323/208 |
| 5,136,455 A | 8/1992 | Billingsley | |
| 5,198,698 A * | 3/1993 | Paul | H02J 9/08 307/46 |
| 6,728,089 B2 | 4/2004 | Harford | |
| 6,744,613 B2 | 6/2004 | McCook et al. | |
| RE39,446 E | 12/2006 | Winch et al. | |

(Continued)

FOREIGN PATENT DOCUMENTS

| | | |
|---|---|---|
| CN | 201479418 U | 5/2010 |
| JP | 2013027102 A | 2/2013 |

OTHER PUBLICATIONS

European Search Report in corresponding European Patent Application No. 15198541, dated May 18, 2016.

*Primary Examiner* — Thienvu Tran
*Assistant Examiner* — Christopher Clark
(74) *Attorney, Agent, or Firm* — Edell, Shapiro & Finnan LLC (57) ABSTRACT

To protect an electrical load from anomalous electricity provided by an electricity source, a switching mechanism is configured to transition into one of conducting and non-conducting states in response to respective on and off states of a switching signal. A power controller evaluates input frequency characteristics of an overvoltage event in input electricity provided by the electricity source against at least one frequency criterion. Event timing is established for the timing signal that corresponds to the frequency characteristics met by the frequency threshold criterion. The event timing coordinates the overvoltage event with the state transitions of the switching mechanism so that an amplitude notch is superimposed on the input electricity over a temporal duration proportionate to that of the overvoltage event. State transitions are compelled in the switching mechanism to superimpose the amplitude notch on the input electricity in accordance with the event timing.

15 Claims, 8 Drawing Sheets

(56) References Cited

U.S. PATENT DOCUMENTS

| | | | |
|---|---|---|---|
| 7,184,252 B2 | 2/2007 | Harford | |
| 7,511,934 B2 | 3/2009 | Benton et al. | |
| 8,482,885 B2* | 7/2013 | Billingsley | H01H 9/541 |
| | | | 361/78 |
| 8,547,672 B2 | 10/2013 | Benton et al. | |
| 2006/0043904 A1* | 3/2006 | De Anna | H05B 33/0809 |
| | | | 315/200 A |
| 2007/0127177 A1 | 6/2007 | Benton et al. | |
| 2011/0068849 A1* | 3/2011 | Grover | H03K 17/166 |
| | | | 327/381 |
| 2012/0007657 A1* | 1/2012 | Naumann | H01H 9/542 |
| | | | 327/434 |
| 2015/0333509 A1* | 11/2015 | Jankowski | G01R 1/36 |
| | | | 361/35 |
| 2016/0254662 A1* | 9/2016 | Dawley | H02H 9/02 |
| | | | 361/93.1 |

* cited by examiner

OVERVOLTAGE NOTCHING OF ELECTRICITY DELIVERED TO AN ELECTRICAL LOAD

TECHNICAL FIELD

The present disclosure relates to limiting voltage delivered by power conditioning and control systems.

BACKGROUND

Electrical load protection devices are electrically interposed between electrical load equipment and electrical source equipment and are designed to protect the load equipment from exceptionable characteristics of electricity received from the source equipment. One type of electrical load protection device is the surge suppressor, which is used to prevent voltage surges from reaching the load equipment. As used herein, a power or voltage surge, or simply "surge," is a transient overvoltage condition of short duration, e.g., 20-50 µs. Traditional surge suppression techniques include shunting mode suppression, by which surge power is shunted to a neutral or ground conductor. Examples of such shunting techniques are disclosed in U.S. Pat. No. 5,136,455 dated Aug. 4, 1992 and entitled, "Electromagnetic Interference Suppression Device," and U.S. Reissue Pat. RE39,446 dated Dec. 26, 2006 and entitled, "Power Filter Circuit Responsive to Supply System Fault Conditions." Another surge suppression technique is series mode suppression, by which surge power is series limited and canceled, and may be further ameliorated by shunt absorption. Examples of series mode suppression techniques are disclosed in U.S. Pat. No. 6,728,089 dated Apr. 27, 2007 and entitled, "Surge Suppressor for Wide Range of Input Voltages," U.S. Pat. No. 6,744,613 dated Jun. 1, 2004 and entitled, "System and Method for Filtering Multiple Adverse Characteristics from a Power Supply Source," U.S. Pat. No. 7,184,252 dated Feb. 27, 2007 and entitled, "Surge Protector with Input Transformer," and U.S. Pat. No. 7,511,934 dated Mar. 31, 2009 and entitled, "System and Method for Conditioning a Power Supply Transmission for Supply to a Load Circuit."

Shunt mode suppression typically carries the lowest cost and is the smallest size option, but it allows exposure of connected load equipment to fairly high amplitude residual voltages. The cost of implementing series mode suppression is typically higher than that of shunt mode suppressors and they are usually larger in size. However, series mode suppressors are capable of limiting exposure to surge voltages at the load to much lower levels, e.g., to within ±10% of the nominal AC line voltage envelope. One drawback common to both of these technologies is that neither provides adequate mitigation of persistent AC overvoltage, referred to herein by as a "swell." Efforts to develop and/or improve mitigation techniques for both voltage surges and voltage swells, among other undesirable power conditions, are ongoing.

SUMMARY

The present general inventive concept realizes technology that limits the connected equipment surge voltage exposure amplitude to below that of traditional technology and limits the connected equipment persistent overvoltage exposure amplitude while allowing the connected equipment to continue operating.

To protect an electrical load from anomalous electricity provided by an electrical source, a switching mechanism is configured to transition into one of conducting and non-conducting states in response to respective on and off states of a switching signal. A power controller evaluates input frequency characteristics of an overvoltage event in input electricity provided by the electricity source against at least one frequency criterion. Event timing is established for the timing signal that corresponds to the frequency characteristics met by the frequency threshold criterion. The event timing coordinates the overvoltage event with the state transitions of the switching mechanism so that an amplitude notch is superimposed on the input electricity over a temporal duration proportionate to that of the overvoltage event. State transitions are compelled in the switching mechanism to superimpose the amplitude notch on the input electricity in accordance with the event timing.

DESCRIPTION OF EXAMPLE EMBODIMENTS

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

The figures described herein include schematic block diagrams illustrating various functional modules for purposes of description and explanation. Such diagrams are not intended to serve as electrical schematics and interconnections illustrated are merely to depict various interoperations between functional components and/or processes and are not necessarily direct electrical connections between such components. Moreover, the functionality illustrated and described via separate components need not be distributed as shown, and the discrete blocks in the diagrams are not intended to depict discrete electrical components.

Figure 1A:
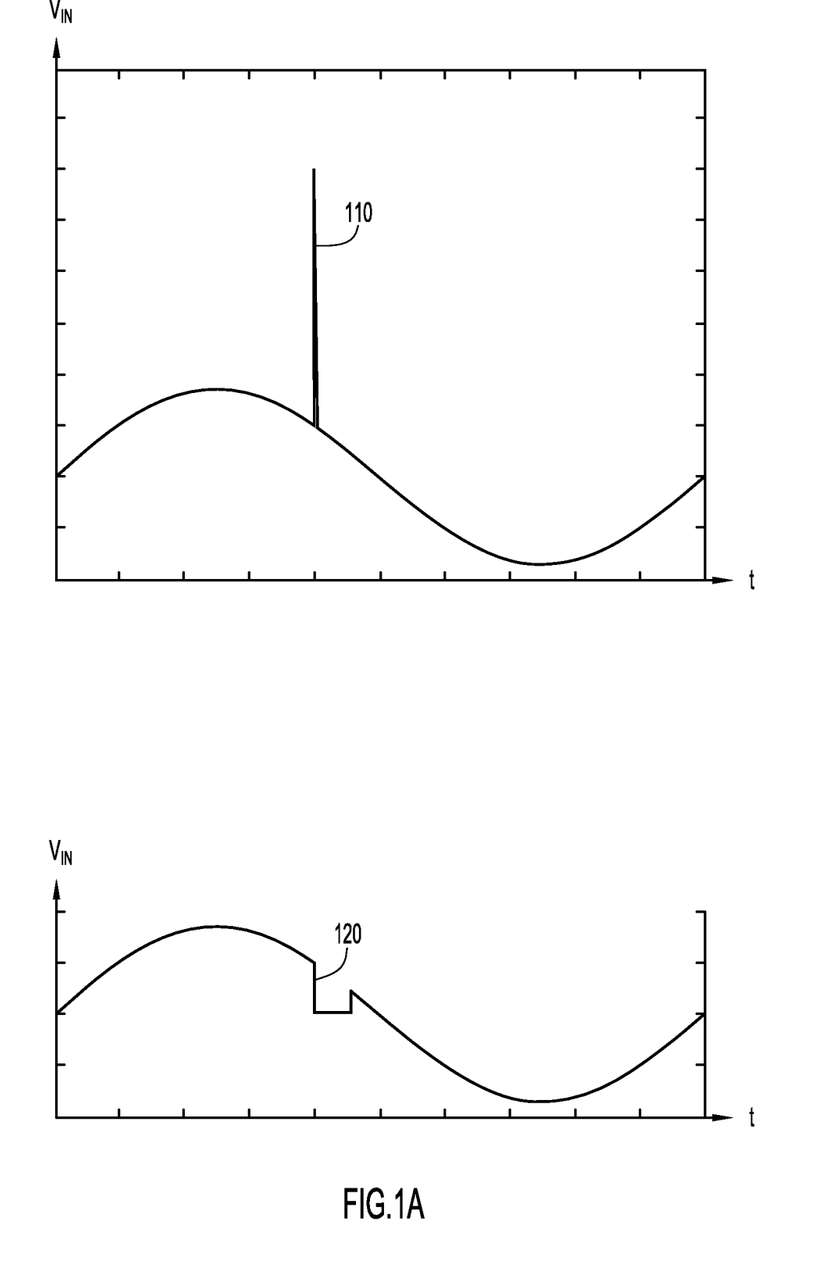
FIGS. 1A-1B are diagrams of voltage waveforms illustrating anomalous electricity mitigation by embodiments of the present general inventive concept.
Figure 1B:
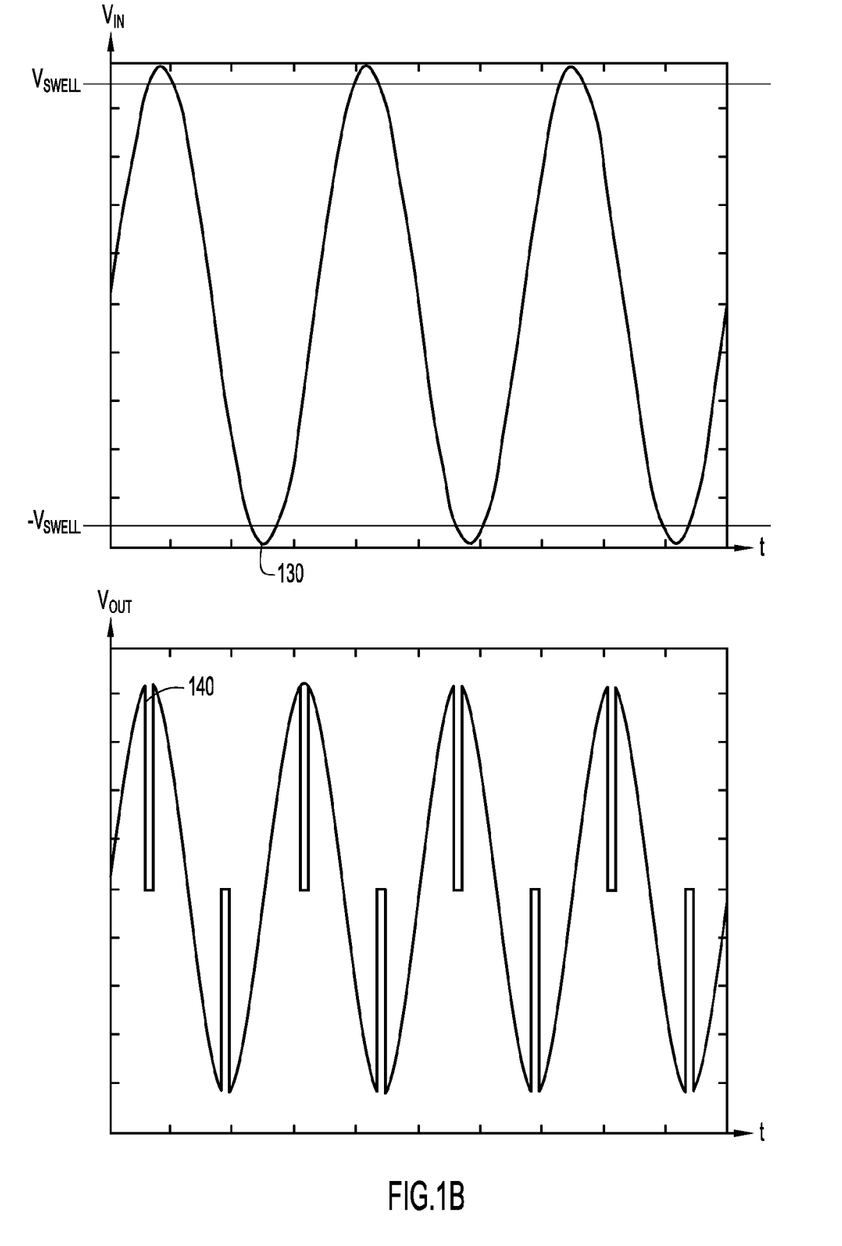

The present invention may be embodied to mitigate both transient surge overvoltage conditions and persistent swell overvoltage conditions. To that end, embodiments may include switching circuitry capable of changing state very rapidly, e.g., on the order of 1 µs, and associated control methods to "notch" transient voltages from the delivered electricity. FIG. 1A illustrates a voltage surge 110 superimposed onto input voltage $V_{IN}$. Through an embodiment of the present invention, a corresponding voltage notch 120 is established in output voltage $V_{OUT}$ at the location in the waveform at which surge 110 was located on $V_{IN}$. Similar mitigation of voltage swells, in which peaks 130 of $V_{IN}$ exceed a predetermined threshold $V_{SWELL}$, is illustrated in FIG. 1B. Through an embodiment of the present invention, voltage notches, representatively illustrated by voltage notch 140, are established in $V_{OUT}$ at each offending peak location.

Figure 2:
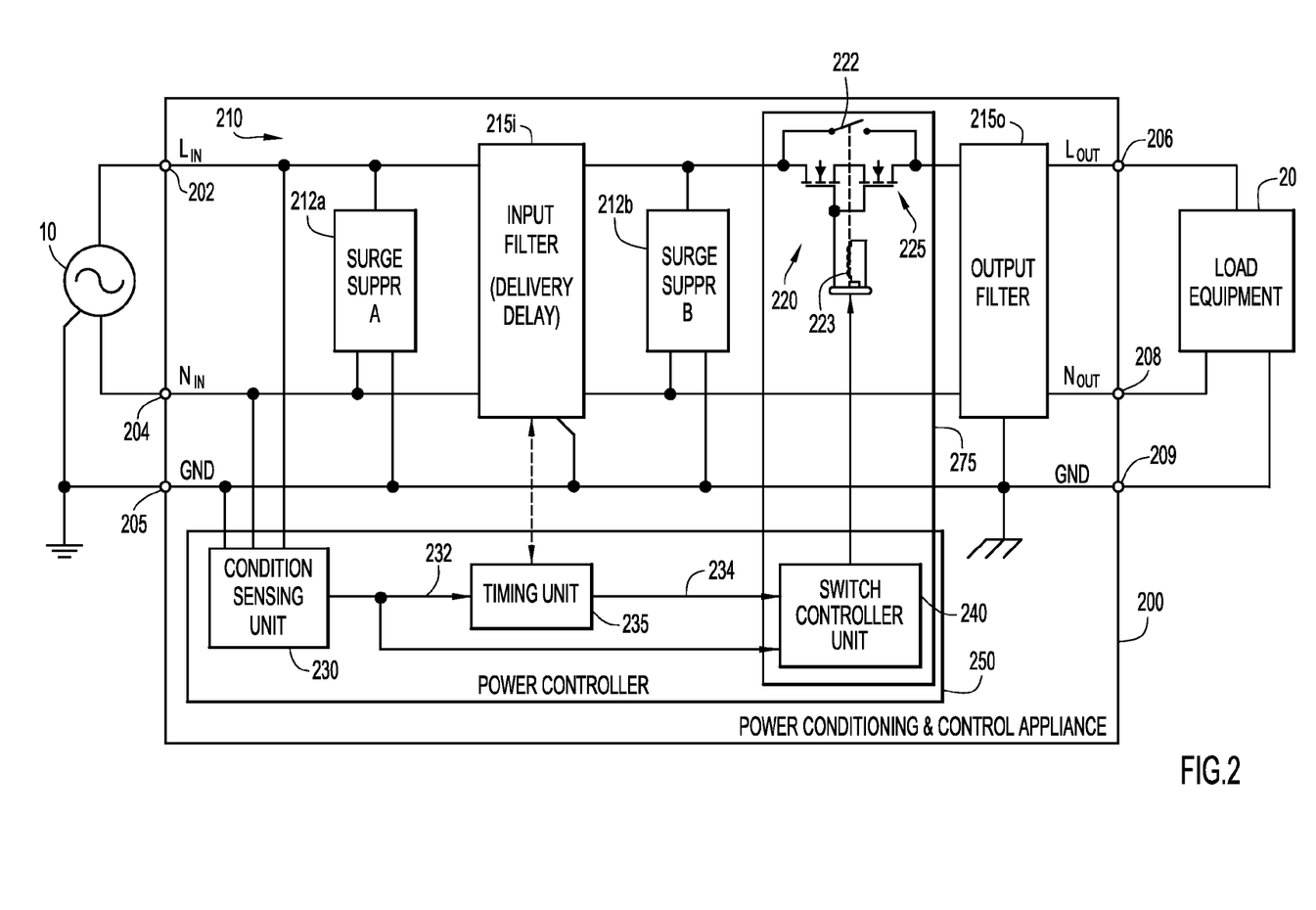
FIG. 2 is a schematic block diagram of a power conditioning and control appliance by which the present general inventive concept can be embodied.

FIG. 2 is a schematic block diagram of an exemplary power conditioning and control appliance (PCCA) 200 by which the present invention can be embodied. Exemplary PCCA 200 is an electrical circuit that, when electrically interposed between an electrical source 10 and electrical load equipment 20, can improve power quality and protect load equipment 20 against various exceptionable electrical conditions. It is to be understood that the functional blocks of which exemplary PCCA 200 is comprised are conceptual and are not intended to represent specific, individual components or hard functional boundaries. That is, separation of power conditioning and control functionality into the blocks illustrated in FIG. 2 and elsewhere in this disclosure is intended solely to facilitate efficient description of an exemplary embodiment of the present invention. Indeed, the functionality of the separate modules illustrated in FIG. 2 may be combined, divided, and otherwise repartitioned into other modules, essentially without limitation. Additionally, components other than and/or in addition to those illustrated in and described herein may be incorporated into PCCA 200 or other embodiments of the present invention. Upon review of this disclosure, those having skill in the power conditioning and control arts will recognize numerous configurations in which PCCA 200 may be realized without departing from the spirit and intended scope of the present invention.

Exemplary PCCA 200 is constructed or otherwise configured to mitigate both transient surge overvoltage conditions and persistent swell overvoltage conditions by way of the above-described notching techniques. To that end, exemplary PCCA 200 may include a switching mechanism 275 by which voltage notches are imparted onto electrical waveforms. For the embodiment illustrated in FIG. 2, the switching mechanism comprises a switch circuit 220 and switch controller unit 240, each capable of rapid state transitions, e.g., on the order of 1 µs, and that cooperate with various support circuits and control methods described below to form the above-described notches. It is to be understood that while switch circuit 220 is illustrated in FIG. 2 as being installed in the line conductor, alternative or additional circuitry can be installed in the neutral conductor and/or in other line conductors, e.g. in multiple phase AC implementations.

PCCA 200 may comprise an AC conditioned power delivery unit 210, or simply "power delivery unit 210," and a power controller 250. Power delivery unit 210 comprises interconnected functional components by which electricity obtained from AC source 10 is processed for delivery to load equipment 20. Power controller 250 comprises interconnected functional components to monitor source electricity provided at input terminals 202, 204 and 205, and to operate switching mechanism 275 in accordance with conditions on the monitored electricity. It is to be understood that while PCCA 200 is intended for use with AC electrical systems, the inventive concepts described herein could also be applied to DC electrical systems.

Switching mechanism 275 may comprise one or more power metal-oxide-semiconductor field-effect transistors (MOSFETs) 225 as semiconductor switch components, such as in switch circuit 220, because of their inherent body diode, switching speed, and ease of use. Other power semiconductor devices may be utilized to perform equivalent functions, including insulated-gate bipolar transistors (IGBTs) and gate turn-off (GTO) thyristors. Additionally, switch circuit 220 may be a hybrid switch circuit that includes a bypass circuit, such as an electromagnetic relay 224 having a coil 223 and contacts 222 operated by switch controller unit 240. Switch controller unit 240 may be implemented in power controller 250, as a fixed electrical circuit and/or programmed processor instructions executed by a microprocessor/microcontroller. In one embodiment, switch controlling unit 240 of switching mechanism 275 includes a high-speed optically-isolated MOSFET/IGBT driver and associated support circuitry capable of responding to a control signal at the aforementioned switching rate.

Power delivery unit 210 may include surge suppression circuitry, illustrated in FIG. 2 as surge suppression stages 212a and 212b, collectively referred to herein as surge suppressor 212. Surge suppression stage 212a provides initial surge suppression and may be constructed from metal oxide varistors (MOVs), or MOVs combined with gas discharge tubes, or series mode technologies. Surge suppression stage 212b may provide secondary/supplementary surge suppression and, in addition to the aforementioned surge suppression components, may include transient voltage suppressor (TVS) diodes and/or bridge rectifier and silicon-controlled rectifier (SCR) clamp/crowbar combinations. In one embodiment, surge suppressor 212 realizes a minimum blocking voltage of 8 kV with 20 A continuous current conduction, although the present invention is not so limited. It is to be understood that the present invention can be embodied without surge suppressor 212.

Power delivery unit 210 of PCCA 200 may include a power filter 215 comprising an input filter 215i and an output filter 215o. Input filter 215i may be a standard electromagnetic interference/radio-frequency interference (EMI/RFI) AC power line filter including inductors, chokes, capacitors, and resistors. Input filter 215i may, by virtue of its construction, introduce a time delay in delivery of AC power to switching mechanism 275. Such a delay allows switching mechanism 275 to be operated into an appropriate state prior to the overvoltage electrical waveform arriving thereat.

Output filter 215o may also include inductors, capacitors, and resistors interconnected to perform smoothing of output waveforms, such as notched and pulse-width modulation (PWM) waveforms. Output filter 215o may also provide, among other things, snubber functionality by which the impact of inductive loads subjected to rapidly switching conditions is ameliorated.

Power controller 250 may include a condition sensing unit 230 that monitors input electricity arriving from source 10 at terminals 202, 204 and 205. Condition sensing circuit 230 may be constructed or otherwise configured to generate a condition-indicating signal 232 in response to various anomalies and/or exceptionable characteristics being present on the input electricity. The condition-indicating signal 232 may be provided to a timing unit 235 and to the switch controlling unit 240 to prepare and operate switch circuit 220 based on the condition observed by condition sensing circuit 230. For example, under nominal operating conditions, i.e., where the input electricity is free of surges and swells, contacts 222 of relay 224 are in a closed state, thus bypassing MOSFETs 225, which may be in the non-conducting state. When an anomaly is sensed at input terminals 202, 204 and/or 205, MOSFETs 225 may be compelled into a conducting state and relay 224 may be compelled to open contacts 222. These actions place switching mechanism 275 in a notching mode or configuration, i.e., electrical power through hybrid switch 220 is controlled solely by the semiconductor circuitry, which can be operated at higher rates than electromagnetic relay 224.

Timing unit 235 of exemplary power controller 250 may generate a timing signal 234 by which the temporal characteristics of the notch are established. For example, for surge mitigation, timing circuit 235 may generate a timing signal 234 that is as temporally narrow as possible, i.e., long enough to encompass the temporal width of the surge and the delay time through input filter 215i. For swell conditions, timing circuit 235 may define a timing signal 234 to cause one or more notches to be formed over the temporal duration for which the peaks of the swell exceed the predetermined swell threshold, as described above.

Power controller 250 may be realized through a wide variety of processing and interface circuitry including, but not limited to fixed analog and digital logic circuits, analog-to-digital converter circuits, digital-to-analog converter circuits, programmable digital logic circuits, application specific circuits, etc., to implement, among other components, general data processors, data-specific processors, signal converters and conditioners, analog and digital signal processors, and so on.

Figure 3:
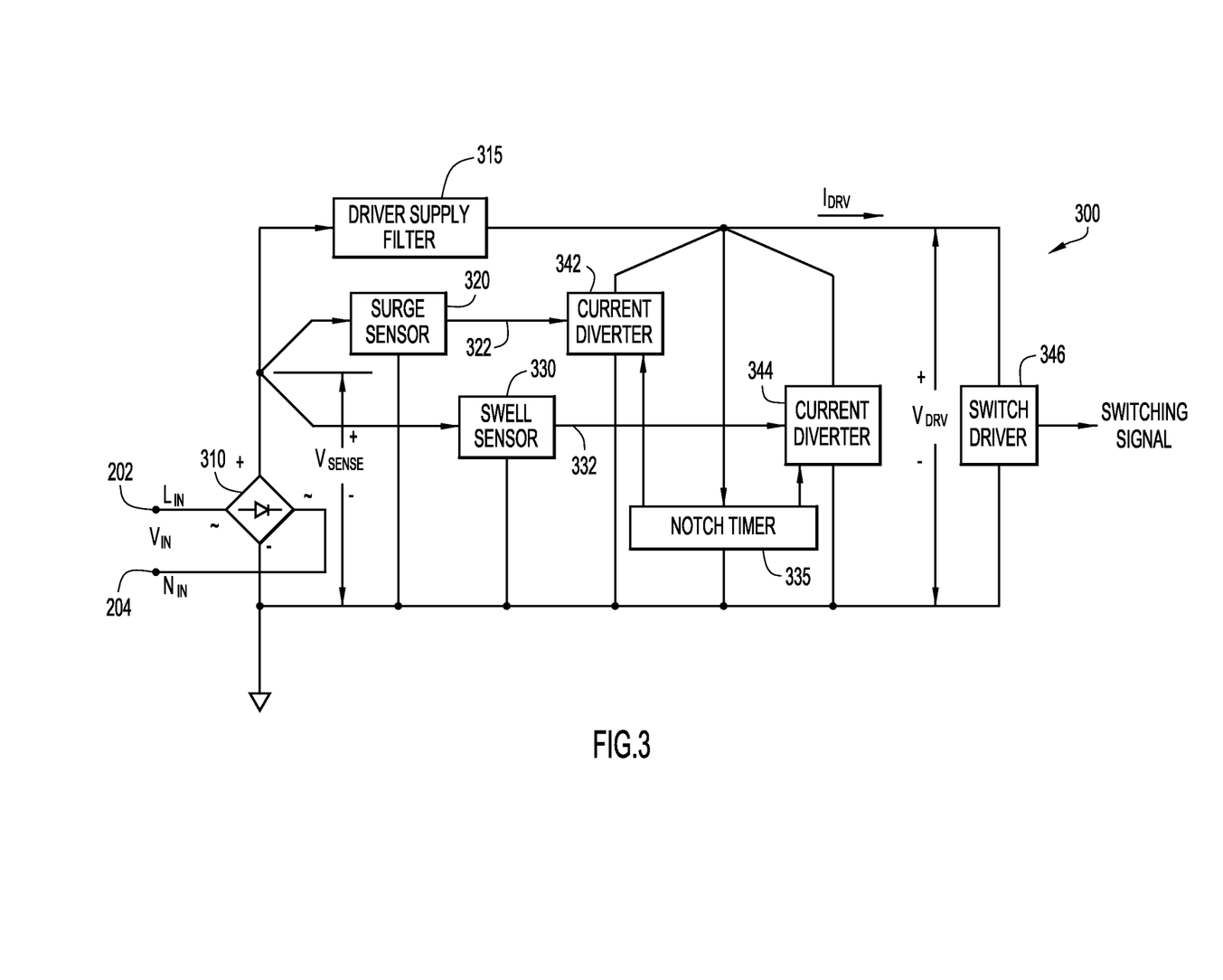
FIG. 3 is a schematic block diagram of a power controller by which the present general inventive concept can be embodied.

FIG. 3 is a schematic block diagram of an exemplary power controller 300 that can be used in embodiments of the present invention. Power controller 300 may be connected to input conductors $L_{IN}$ and $N_{IN}$ and may be configured to, among other things, monitor the AC line voltage, e.g., the instantaneous potential $V_{IN}$ between $L_{IN}$ and $N_{IN}$ or between either or both of $L_{IN}$ and $N_{IN}$ and a ground conductor (not illustrated), and to control the state of switching mechanism 275 accordingly.

Power controller 300 may include a rectifier 310 to reflect negative voltage AC half-cycles about zero volts so that both positive and negative overvoltage events can be identified. Rectifier 310 may be electrically connected to input terminals 202 and 204 and timing circuit 235. The rectified input electricity, referred to herein as voltage $V_{SENSE}$, may be provided to a driver supply filter 315 from which switch driver current $I_{DRV}$ is provided to switch driver 346. Under nominal conditions, IDRV may be sufficient to maintain voltage $V_{DRV}$ across the control input of switch driver 346 at a level that exceeds an "on" threshold. Accordingly, switch driver 346 may be compelled into its on state and, in response, switch circuit 220 is compelled into its conducting state thus providing nominal electrical power to load equipment 20.

Voltage $V_{SENSE}$ may also be provided to one or more condition sensing circuits, such as, for example, a surge sensor 320 which is configured to detect and indicate voltage surges and a swell sensor 330 configured to detect and indicate voltage swells. Each sensor circuit 320 and 330 may be electrically coupled to a corresponding current diverter 342 or 344 and each current diverter 342 or 344 may react to a corresponding condition indicating signal 322 or 332, respectively, by diverting a portion of current $I_{DRV}$ away from the input of switch driver 346, such as by establishing a low impedance path to signal ground, over a temporal interval established by notch timer 335. When sufficient current has been drawn to reduce switch driver voltage $V_{DRV}$ to below an "off" threshold, switch driver 346 may be compelled into its off state and, in response, switch circuit 220 is compelled into its non-conducting state thus preventing the overvoltage from passing to load equipment 20.

Figure 4:
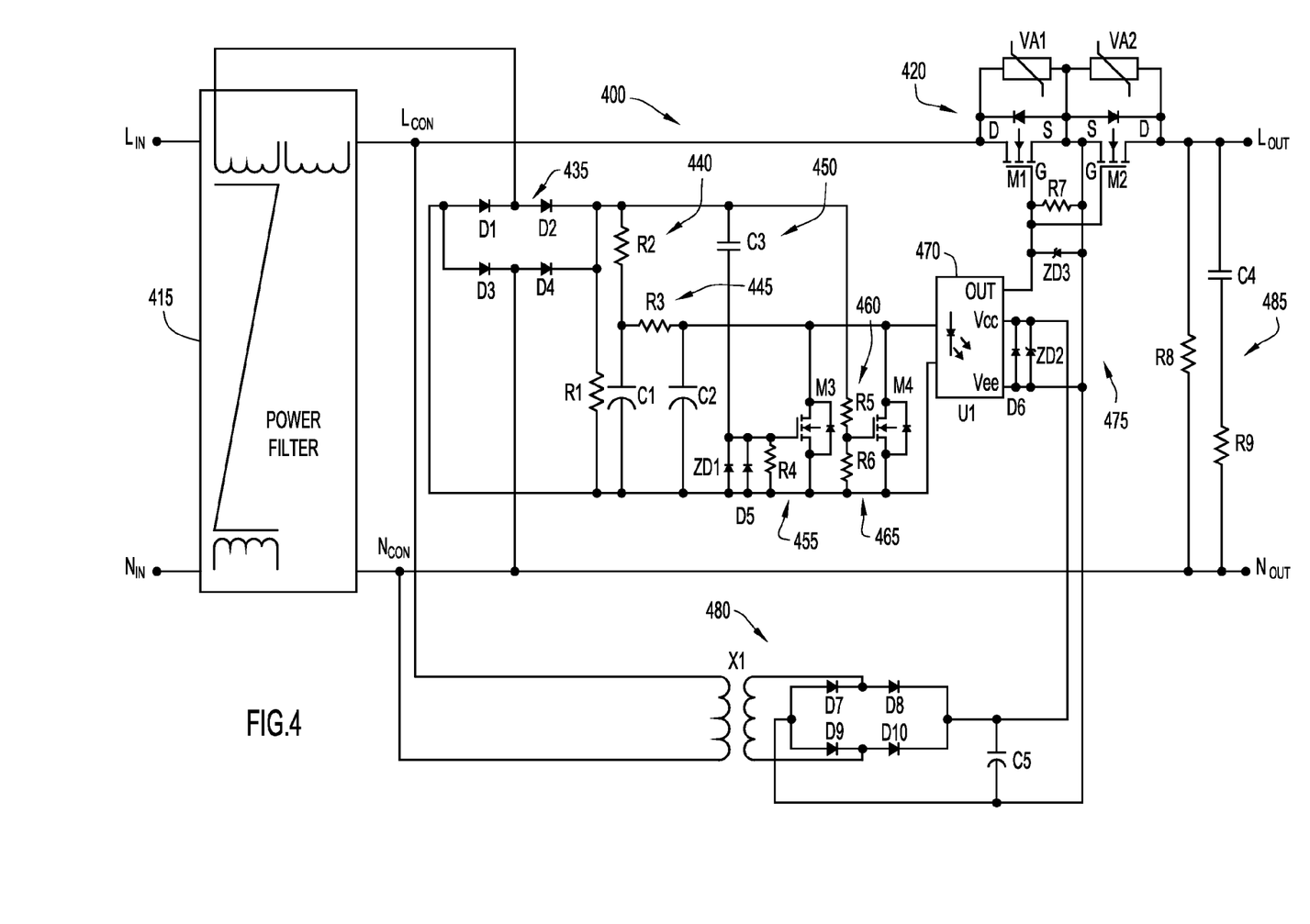
FIG. 4 is a schematic diagram of a power conditioning and control circuit by which the present general inventive concept can be embodied.

FIG. 4 is an electrical schematic diagram of an exemplary PCCA 400 embodied in accordance with the present invention. PCCA 400 is functionally similar to PCCA 200, but is illustrated in more detail for purposes of extending the explanation of various features that can be implemented in embodiments of the present invention. It is to be understood that PCCA 400 is described herein with regard to normal or differential mode transients occurring between line and neutral conductors; however, it is to be understood that common mode transients may be ameliorated using the inventive concepts described herein by suitable electrical coupling to a ground conductor, as those with skill in the electrical design arts will recognize and appreciate.

Power filter 415 may be electrically interposed between line and neutral conductors $L_{IN}$ and $N_{IN}$, respectively, to which an electrical power source may be connected, and line and neutral conductors $L_{CON}$ and $N_{CON}$, respectively, on which conditioned electrical power may be provided. In so doing, power filter 415 may impart a known delay in delivery of electrical current.

Switching mechanism 475 of exemplary PCCA 400 comprises a switch circuit 420 and a switch driver 470. Switch circuit 420 of exemplary PCCA 400 comprises a pair of power MOSFETs M1 and M2 connected one to the other at their sources and at their gates. Switch driver 470 may be implemented by an optically isolated MOSFET/IGBT driver U1. A floating DC voltage source 480 comprising transformer X1, rectifier formed by diodes D7-D10, and capacitor C5 provides operating voltages $V_{CC}$ and $V_{EE}$ for switching mechanism 475.

Switch circuit 420 may be compelled into its respective conducting and non-conducting states by applying voltage $V_{SW}$ across the commonly-connected gates by way of switch driver 470. A resistor R7 may be connected across the commonly-connected gate-source junctions to dampen oscillations owing to lead inductance and gate capacitance of MOSFETs M1 and M2. VA1 and VA2 may be 600-650V MOVs to protect MOSFETs M1 and M2 from voltage transients generated when rapidly switching off a large inductive load. The combination of capacitor C4 and resistor R9 forms a snubber circuit also intended to mitigate artifacts of switching inductive loads. Zener diode ZD2 and diode D6 protect switch driver 470.

Diodes D1-D4 form rectifier 435 by which input voltage $V_{IN}$ is represented through positive voltage values. The rectified voltage waveform $V_{SENSE}$ appears across resistor R1, across driver supply filter 440, surge sensor 450 and swell sensor 460. Driver supply filter 440 may be implemented by a lowpass filter formed from resistors R2 and R3, and capacitors C1 and C2. The combination of resistor R3 and capacitor C2 may also serve as notch timer 445. Driver supply filter 440 produces voltage $V_{DRV}$, which is applied across current diverters 455 and 465 and switch driver 470. The output of switch driver 470 is connected to switch circuit 420.

Surge sensor 450 may be implemented by a highpass filter formed of the combination of capacitor C3 and resistor R4 for which the passband is well-removed from the nominal frequency of the input signal $V_{IN}$. Indeed, values of capacitor C3 and resistor R4 may be selected to pass pulses of a predetermined, maximum duration corresponding to temporally narrow voltage surges. The output of the highpass filter, i.e., the node between capacitor C3 and resistor R4 is connected across the gate-source junction of MOSFET M3 of current diverter 455. Longer, persistent events may be detected by swell sensor 460, which may be implemented by a voltage divider formed of resistors R5 and R6. The output of the voltage divider, i.e., the node between resistors R5 and R6, is connected across the gate-source junction of MOSFET M4 of current diverter 465.

Operation of PCCA 400 will now be described with additional reference to FIGS. 5A-5B, collectively referred to herein as FIG. 5. FIG. 5 diagrammatically depicts several waveforms representing those provided to and generated by circuitry in PCCA 400. However, it is to be understood that the waveforms of FIG. 4 are not drawn to scale and that relative size between various waveform features has been distorted for purposes of description.

Under conditions of steady-state, nominal AC input electricity provided on conductors $L_{IN}$ and $N_{IN}$, i.e., when $V_{IN}$ is within established operational tolerances for delivery to attached load equipment, source voltage $V_{IN}$ is provided to rectifier circuit 435, which produces rectified voltage waveform $V_{SENSE}$ across resistor R1, driver supply filter 440, surge sensor 450 and swell sensor 460. At some instant in time, e.g., time $t_0$ in FIG. 5A, a voltage surge 510 arrives at PCCA 400. Voltage surge 510, being of sufficient amplitude and spectral characteristics, passes through the highpass filter of surge sensor 450 as voltage $V_{R4}$ and appears as a corresponding voltage spike 520 across resistor R4. Voltage spike 520 momentarily asserts a conducting state in MOSFET M3 of current diverter 455 through which capacitor C2 is discharged through the drain-source resistance of MOSFET M3, which is represented as voltage drop 532 of $V_{DRV}$. Once $V_{R4}$ falls below the threshold voltage of MOSFET M3, which occurs somewhere on the falling edge of voltage spike 520, MOSFET M3 transitions into its non-conducting state, at which time capacitor C2 begins charging through resistor R3. As capacitor C2 charges, voltage $V_{DRV}$ rises in accordance with the R3*C2 time constant, as illustrated at voltage rise 534 in FIG. 5A.

Figure 5A:
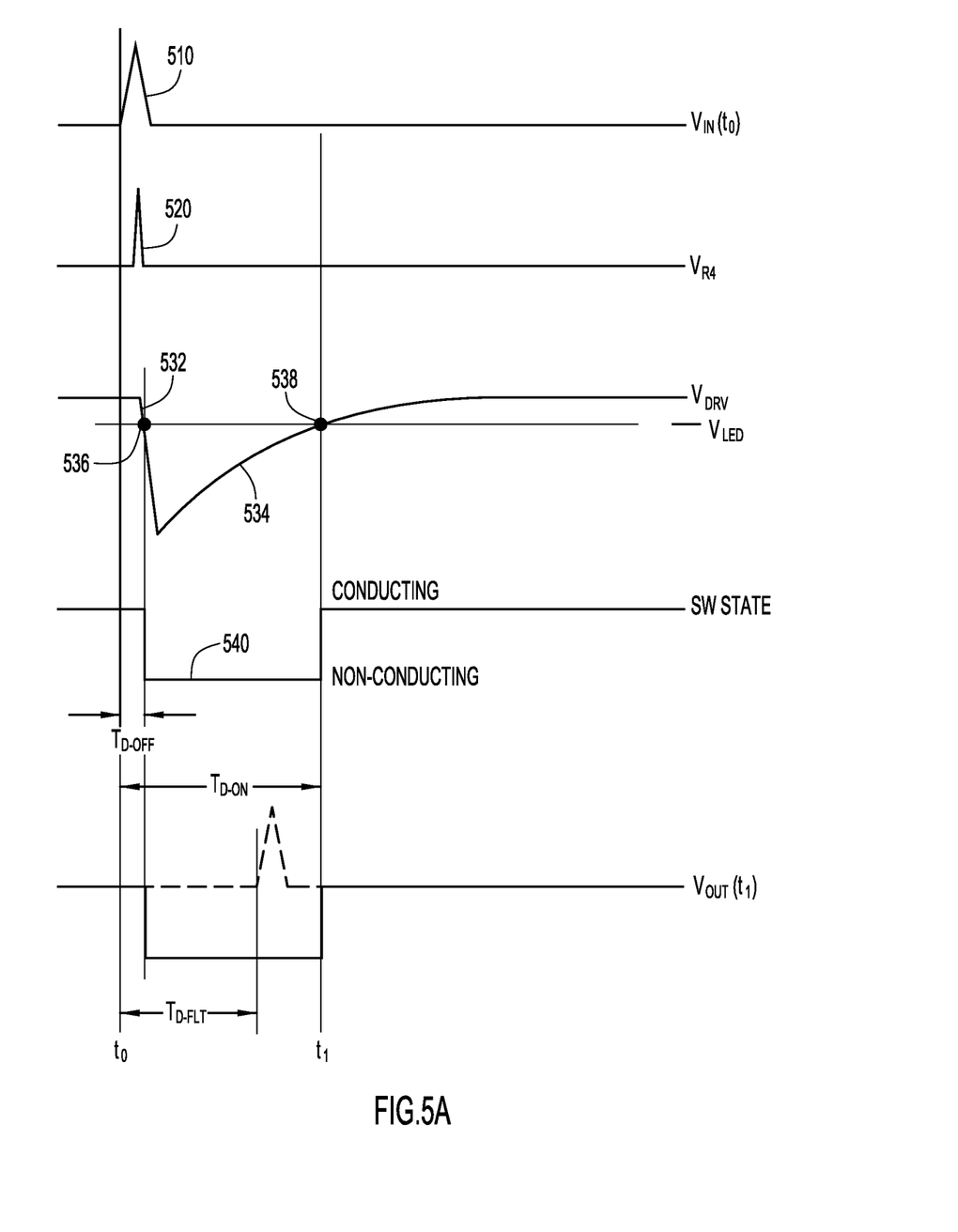
FIGS. 5A-5B are diagrams illustrating notch timing achieved by embodiments of the present general inventive concept.

Voltage threshold $V_{LED}$ in FIG. 5A represents the voltage at which the LED in optically-isolated MOSFET/IGBT driver U1 begins light emissions. Thus, when $V_{DRV} \geq V_{LED}$, illustrated intersection 538 in FIG. 5A, the output of switch driver 470, i.e., voltage $V_{SW}$, is in its on state that compels switch circuit 420 into its conducting state. Conversely, when $V_{DRV} < V_{LED}$, corresponding to intersection 536 in FIG. 5A, the voltage $V_{SW}$ is in its off state that compels switch circuit 420 into its non-conducting state. Notch 540 on $V_{SW}$ may be superimposed on $V_{OUT}$ between time $t_0$ and $t_1$ by timed action of switch circuit 420 and, in so doing, prevents voltage surge 510 from reaching load equipment 20.

The time delay introduced into the surge current by input filter 415 is indicated in FIG. 5A as $T_{D-FLT}$. In exemplary PCCA 400, delay $T_{D-FLT}$ is fixed by the reactance of input filter 415. However, in certain embodiments, the delay $T_{D-FLT}$ can be made a system variable through the use of, for example, electrical delay components and/or through programmed instructions in a digital implementation of the power controller. The time delay $T_{D-OFF}$, i.e., the time between the surge event and the transition of switch circuit 420 into its non-conducting state is dependent upon the time in which $V_{DRV}$ falls below $V_{LED}$. In response, switch driver 470 may be compelled into its off state, which in turn is dependent upon the time constant $R_{M3-ON}*C2$, where $R_{M3-ON}$ is the input resistance of MOSFET M3 when in its conducting state. The time delay $T_{D-ON}$, i.e., the time between the surge event and the transition of switch circuit 420 into its conducting state is dependent upon the time in which $V_{DRV}$ crosses $V_{LED}$ and thus compelling switch driver 470 into its on state, which in turn is dependent upon the time constant R3*C2.

Figure 5B:
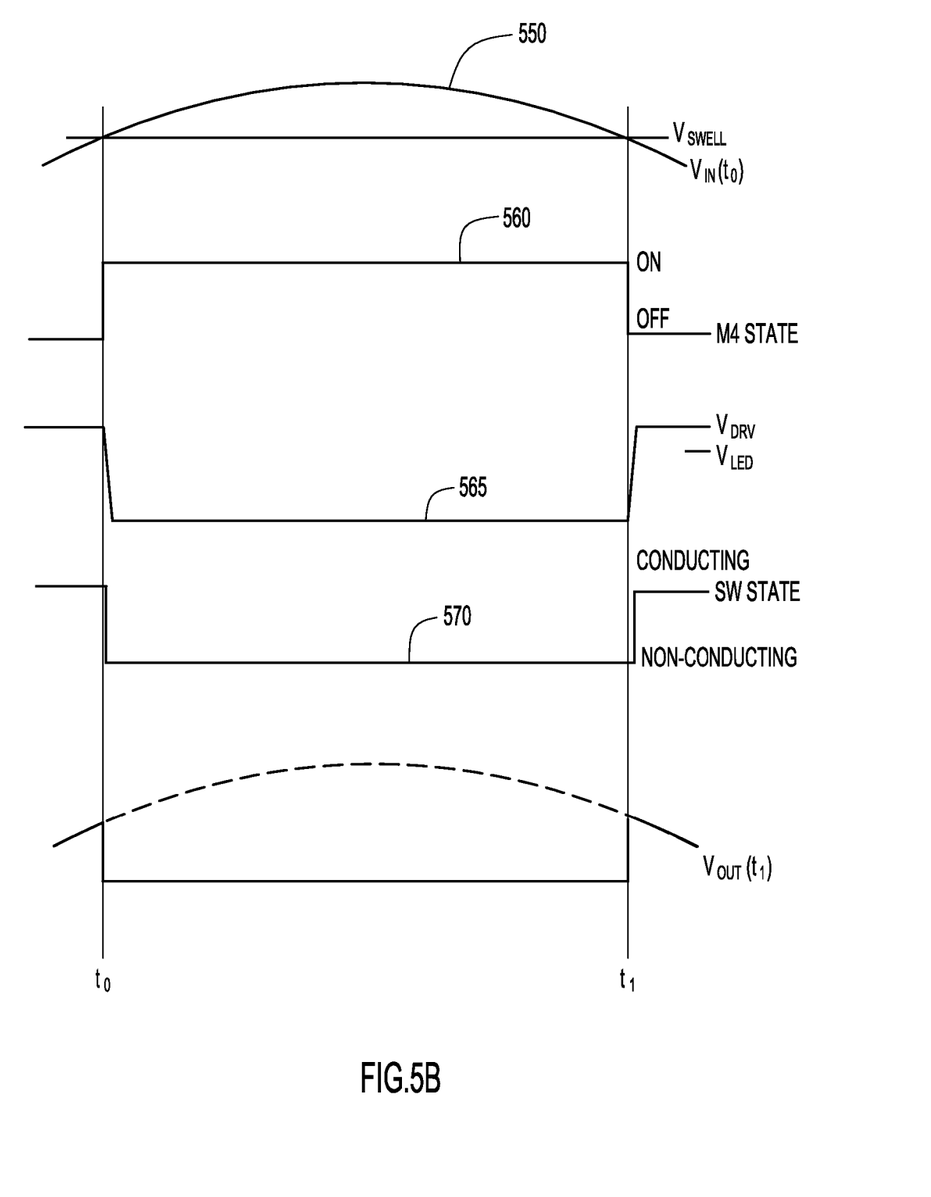

FIG. 5B is a diagram of several exemplary waveforms by which amelioration of voltage swells can be explained. At time $t_0$, an overvoltage may be detected by way of voltage peak 550 exceeding an overvoltage threshold $V_{SWELL}$. A voltage swell is acknowledged when successive peaks 550 in the incoming input electrical waveform exceed overvoltage threshold $V_{SWELL}$. The voltage divider of R5 and R6 may be constructed to bias MOSFET M4 at the threshold $V_{SWELL}$. When so embodied, swell detector MOSFET M4 is in its on state for the duration 560 over which voltage peak 550 exceeds $V_{SWELL}$. Over a corresponding interval 565, current is drawn from driver current $I_{DRV}$ through MOSFET M4 of current diverter 465. When $V_{DRV} \geq V_{LED}$, the output $V_{SW}$ of switch driver 470 is in its on state to compel switch circuit 420 into its conducting state. Conversely, when $V_{DRV} < W_{LED}$, the voltage $V_{SW}$ is in its off state to compel switch circuit 420 into its non-conducting state. Notch 570 may be superimposed on $V_{OUT}$ between time $t_0$ and $t_1$ by timed action of switch circuit 420 and, in so doing, prevents voltage peak 550 from reaching load equipment 20.

Figure 6:
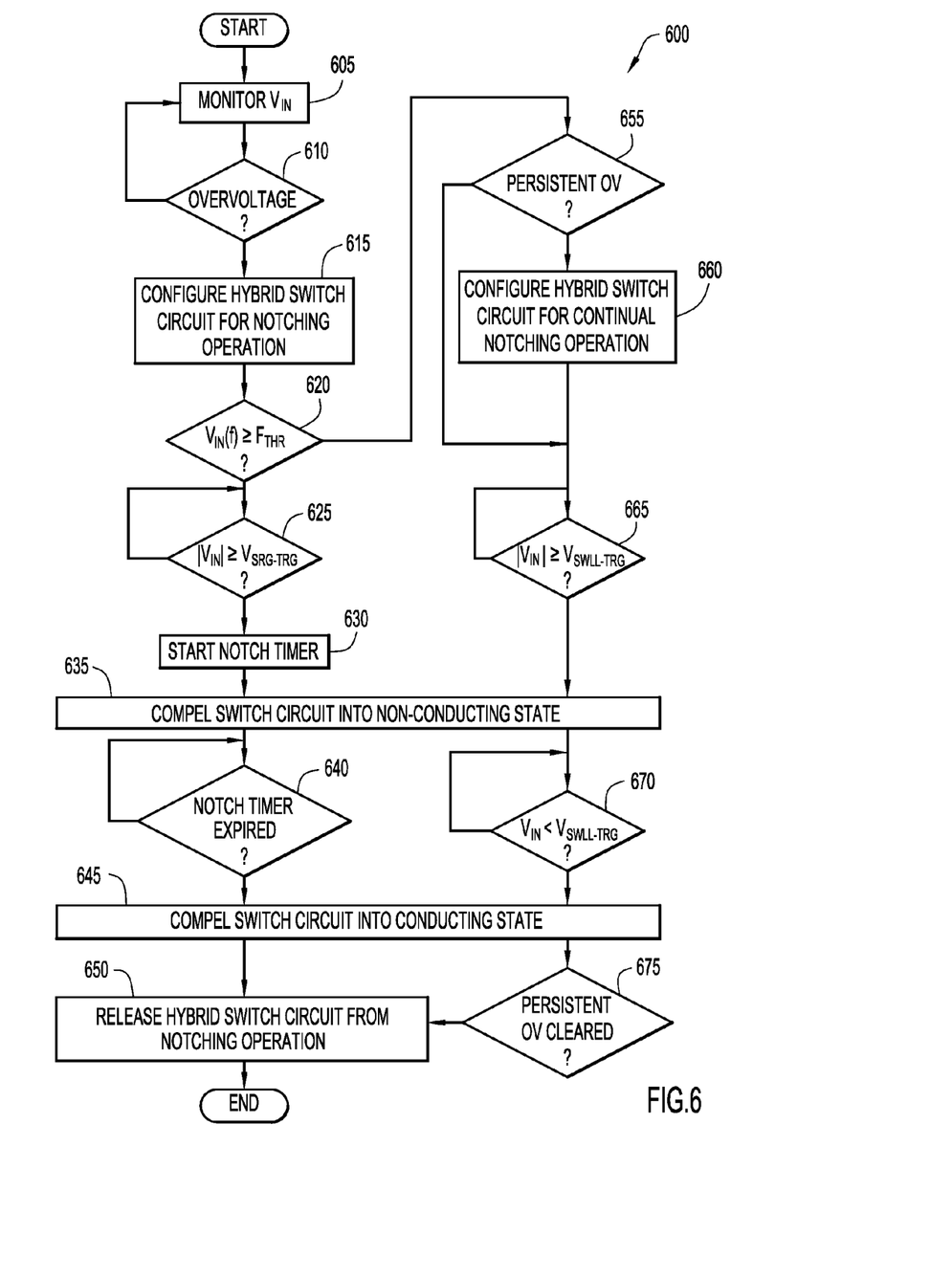
FIG. 6 is a flow diagram of a power control process by which the present general inventive concept can be embodied.

FIG. 6 is a flow diagram of a power control process 600 by which the present invention can be embodied. Power control process 600 can be implemented by electrical and/or electronic circuitry, as described above, or as suitably programmed processor instructions executing on a processor, e.g., a microcontroller and/or microprocessor. In operation 605, input voltage $V_{IN}$ is monitored and, in operation 610, the monitored input voltage is evaluated for an overvoltage condition. If it is determined that an overvoltage condition exists, process 600 may transition to operation 615 by which the hybrid switch circuit, if such is being utilized, is prepared for notching operations. For example, in one embodiment where the hybrid switch comprises an electromagnetic bypass relay across a semiconductor switch circuit, the semiconductor switch circuitry can be compelled into its conducting state and the electromagnetic relay can be compelled into its open state. However, it is to be understood that operation 610 can be omitted or replaced with a switch configuration operation suitable to the switch architecture used, if such is needed.

In operation 620, it is determined whether the frequency content of the input electricity $V_{IN}(f)$ is greater than a predetermined frequency threshold $F_{THR}$, such as by the use of an analog or digital highpass filter. If it is affirmed that $V_{IN}(f) \geq F_{THR}$, it is determined in operation 625 whether the amplitude of $V_{IN}$, $|V_{IN}|$, is greater than a trigger threshold established for surge triggering, $V_{SRG-TRG}$. In response to such occurring, process 600 may transition to operation 630 by which a notch timer may be started, which may be achieved by, for example, a resistor-capacitor delay circuit as described above. Alternatively, such may be achieved through a processor-configurable timer circuit or counter. In operation 635, the switch circuit may be compelled into its non-conducting state. In operation 640, it is determined whether the notch timer has expired. Once such has occurred, the switch circuit may be compelled into its conducting state in operation 645 and, in operation 650, the hybrid switch circuit may be released from notching operations, e.g., the bypass relay can be closed and semiconductor switch circuit can be compelled into its non-conducting state.

If, in operation 620, it is determined that $V_{IN}(f)<F_{THR}$, process 600 may transition to operation 655, by which it is determined whether the overvoltage condition identified in operation 610 is persistent, i.e., a voltage swell. If it is affirmed that the overvoltage condition is persistent, the hybrid switch circuit may be configured for continual notching operation in operation 660. This mode may be identical to the configuration established in operation 615, but the hybrid switch is not released after every overvoltage notching operation. In operation 665, it is determined whether the amplitude $|V_{IN}|$ is greater than a trigger threshold established for swell triggering, $V_{SWLL-TRG}$. In response to such occurring, process 600 may transition to operation 635 by which the switch circuit may be compelled into its non-conducting state. In operation 670, it is determined whether amplitude $|V_{IN}|$ has fallen below threshold $V_{SWLL-TRG}$. Once such has occurred, the switch circuit may be compelled into its conducting state in operation 645. In operation 675, it is determined whether the persistent overvoltage condition has been cleared and, if so, process 600 may transition to operation 650 by which the hybrid switch circuit may be released from notching operations, e.g., the bypass relay can be closed and semiconductor switch circuit can be compelled into its non-conducting state.

Having described preferred embodiments of new and improved power-centric conditioning and control techniques, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

The invention claimed is:

1. An apparatus to protect an electrical load connected to output terminals thereof from anomalous electricity in input electricity provided by an electricity supply connected to input terminals thereof, the apparatus comprising:
   an electrical switch circuit configured to transition into one of conducting and non-conducting states in response to respective on and off states of a switching signal provided thereto;
   a switch controlling unit configured to generate the switching signal so as to compel the state transitions in the switch circuit that superimpose an amplitude notch in the input electricity;
   at least one condition-sensing unit electrically coupled to the input terminals and configured to generate a corresponding condition-indicating signal in response to characteristics of the input electricity meeting a corresponding overvoltage event criterion;
   a timing unit electrically coupled to the condition-sensing unit and configured to generate a timing signal in response to the condition-indicating signal, the timing signal being provided to the switch controlling unit to coordinate timing of the overvoltage event with the state transitions of the switch circuit over a temporal duration proportionate to that of the overvoltage event;
   a switch driver having control terminals through which to receive the timing signal, the switch driver configured to generate the switch signal in the on and off states over the temporal duration to compel the switch circuit into each of the corresponding conducting and non-conducting states; and
   at least one current diverter electrically coupled to the corresponding at least one condition-sensing unit and being responsive to a trigger signal provided therefrom to provide a conductive path in parallel with a conductive path through the control terminals of the switch driver.

2. The apparatus of claim 1, wherein the condition-sensing unit comprises a high pass filter configured to provide the trigger signal to the current diverter in response to a surge overvoltage event.

3. The apparatus of claim 2, further comprising:
   a delay circuit electrically interposed between the input terminals and the switch circuit and being configured to impart a predetermined temporal delay in delivery of current from the input terminal to the switch circuit.

4. The apparatus of claim 3, wherein the delay circuit is an electrical input filter.

5. The apparatus of claim 3, wherein the timing unit comprises a resistor-capacitor circuit having a predetermined RC time constant proportionate to the sum of the temporal duration of the overvoltage event and the temporal delay imparted by the delay circuit.

6. The apparatus of claim 1, wherein the condition-sensing unit comprises a voltage divider configured to provide the trigger signal to the current diverter in response to a swell overvoltage event.

7. The apparatus of claim 6, wherein the current diverter is a transistor and the voltage divider biases the transistor at a threshold voltage defining the swell overvoltage.

8. The apparatus of claim 1, wherein the switch driver is an optically-isolated semiconductor switch driver characterized by a switching time of no more than 10 µs.

9. The apparatus of claim 1, wherein the switch circuit comprises:
   at least one semiconductor switch component having a control terminal that controls electrical current between controlled terminals; and
   an electromechanical relay having contacts respectively connected to the controlled terminals of the semiconductor switch component.

10. The apparatus of claim 1, wherein the input electricity is alternating-current (AC) electricity and the condition-sensing unit comprises a rectifier configured to full-wave rectify the AC electricity.

11. The apparatus of claim 1, wherein the input electricity is direct-current (DC) electricity.

12. An apparatus to protect an electrical load connected to output terminals thereof from anomalous electricity provided by an electricity supply connected to input terminals thereof, the apparatus comprising:
   a switching mechanism configured to transition into one of conducting and non-conducting states in response to respective on and off states of a switching signal provided thereto; and
   a power controller configured to:
   evaluate input frequency characteristics of an overvoltage event in input electricity provided by an electricity source against at least one frequency criterion, to produce at least one condition indicating signal;
   establish, based on the at least one condition indicating signal, event timing corresponding to the frequency criterion met by the predetermined frequency threshold criterion, the event timing coordinating the overvoltage event with the state transitions of the switching mechanism by which electricity amplitude corresponding to the overvoltage event is decreased by an amplitude notch superimposed on the input electricity over a duration proportionate to that of the overvoltage event;

compel the state transitions of the switching mechanism to superimpose the amplitude notch on the input electricity in accordance with the event timing;

wherein the power controller includes:
  a switch driver having control terminals to receive a timing signal representative of the event timing and, responsive thereto, generate the on and off states of the switch signal over a temporal duration proportionate to that of the overvoltage event; and
  at least one current diverter to provide, responsive to the at least one condition indicating signal, a conductive path in parallel with a conductive path through the control terminals of the switch driver.

13. The apparatus of claim 12, further comprising:
a delay component to delay input current by a predetermined delay time; and wherein the power controller is further configured to:
  determine whether the input frequency exceeds a frequency threshold associated with a surge overvoltage event;
  generate the timing signal to coordinate arrival of the delayed input current at the switching mechanism with the state transitions of the switching mechanism.

14. The apparatus of claim 13, wherein the delay component is an electrical input filter.

15. The apparatus of claim 13, wherein the power controller is configured to generate the timing signal to:
  compel a state transition from a conducting state to a non-conducting state of the switching mechanism in response to the determination that the input frequency exceeds the frequency threshold; and
  compel a state transition from the non-conducting state to the conducting state of the switching mechanism subsequently to the state transition from the conducting state to the non-conducting state thereof and a time-lapse proportionate to the overvoltage event and the delay time.

* * * * *